(12) United States Patent
Lindberg

(10) Patent No.: US 12,466,410 B2
(45) Date of Patent: Nov. 11, 2025

(54) ELECTRIC MACHINE WITH A VARIABLE STATOR GEOMETRY CONFIGURED FOR ADJUSTABLE POWER LOSS

(71) Applicant: Volvo Truck Corporation, Gothenburg (SE)

(72) Inventor: Johan Lindberg, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 235 days.

(21) Appl. No.: 18/559,361

(22) PCT Filed: May 12, 2021

(86) PCT No.: PCT/EP2021/062624
§ 371 (c)(1),
(2) Date: Nov. 7, 2023

(87) PCT Pub. No.: WO2022/237977
PCT Pub. Date: Nov. 17, 2022

(65) Prior Publication Data
US 2024/0227810 A1  Jul. 11, 2024

(51) Int. Cl.
*B60W 30/18* (2012.01)
*B60W 10/08* (2006.01)
(Continued)

(52) U.S. Cl.
CPC ...... *B60W 30/18127* (2013.01); *B60W 10/08* (2013.01); *B60W 30/188* (2013.01);
(Continued)

(58) Field of Classification Search
CPC ............. B60L 2200/36; B60L 2240/12; B60L 2240/425; B60L 2240/545; B60L 2240/642; B60L 2240/70; B60L 2260/44; B60L 58/12; B60L 58/40; B60L 7/02; B60W 10/08; B60W 2300/125; B60W 2556/50;
(Continued)

(56) References Cited

U.S. PATENT DOCUMENTS

| | | | | |
|---|---|---|---|---|
| 7,385,332 B2 * | 6/2008 | Himmelmann | ...... | H02K 21/027 310/191 |
| 11,223,251 B2 * | 1/2022 | Angrick | ................... | H02K 1/30 |

(Continued)

FOREIGN PATENT DOCUMENTS

| EP | 3154158 A1 | 4/2017 |
|---|---|---|
| EP | 3154158 B1 | 4/2020 |

(Continued)

OTHER PUBLICATIONS

JP-2004336915-A, all pages (Year: 2004).*

(Continued)

*Primary Examiner* — Naishadh N Desai
(74) *Attorney, Agent, or Firm* — Sage Patent Group

(57) ABSTRACT

An electric machine for a heavy-duty vehicle, the electric machine including a stator and a rotor separated by an air gap, where the stator includes a stator reconfiguration device arranged to modify a magnetic property of the stator, wherein the stator is mechanically reconfigurable by the stator reconfiguration device to allow control of magnetic flux in the air gap.

14 Claims, 8 Drawing Sheets

(51) Int. Cl.
  *B60W 30/188* (2012.01)
  *H02K 1/02* (2006.01)
  *H02K 1/12* (2006.01)
  *H02K 11/00* (2016.01)

(52) U.S. Cl.
  CPC .............. *H02K 1/02* (2013.01); *H02K 1/12* (2013.01); *H02K 11/0094* (2013.01); *B60W 2300/125* (2013.01); *B60W 2556/50* (2020.02); *B60W 2900/00* (2013.01); *H02K 2213/09* (2013.01)

(58) Field of Classification Search
  CPC ....... B60W 2900/00; B60W 30/18127; B60W 30/188; H02K 1/02; H02K 1/06; H02K 1/12; H02K 1/14; H02K 11/0094; H02K 2213/09
  See application file for complete search history.

(56) References Cited

U.S. PATENT DOCUMENTS

| | | | |
|---|---|---|---|
| 2003/0102769 A1 | 6/2003 | Calley | |
| 2008/0238217 A1* | 10/2008 | Shah | H02K 21/12 310/156.01 |
| 2008/0246430 A1* | 10/2008 | Yanagihara | B60L 15/007 318/831 |
| 2010/0252341 A1 | 10/2010 | Shu et al. | |
| 2012/0025747 A1 | 2/2012 | Foster | |
| 2012/0081060 A1 | 4/2012 | Ishikawa et al. | |
| 2012/0176074 A1 | 7/2012 | Dubois et al. | |
| 2015/0202966 A1 | 7/2015 | Oyama et al. | |
| 2015/0298553 A1 | 10/2015 | Maiterth et al. | |
| 2017/0282751 A1 | 10/2017 | Fukuchi et al. | |
| 2019/0207447 A1 | 7/2019 | Swales et al. | |
| 2020/0106316 A1 | 4/2020 | Ross et al. | |

FOREIGN PATENT DOCUMENTS

| | | | |
|---|---|---|---|
| GB | 2477229 B | | 1/2012 |
| GB | 2485300 A | | 5/2012 |
| JP | 2004336915 A | * | 11/2004 |
| JP | 2018193019 A | | 12/2018 |
| WO | 2016000697 A1 | | 1/2016 |
| WO | 2016103486 A1 | | 6/2016 |

OTHER PUBLICATIONS

Communication Pursuant to Rules 161(1) and 162 EPC, European Patent Application No. 21726079.3, mailed Dec. 19, 2023.
International Preliminary Report on Patentability, International Application No. PCT/EP2021/062624, mailed May 12, 2022, 15 pages.
International Search Report and Written Opinion, International Application No. PCT/EP2021/062624, mailed Feb. 8, 2022, 16 pages.
Morimoto, Shigeo, et al, "Loss Minimization Control of Permanent Magnet Synchronous Motor Drives", IEEE Transactions on Industrial Electronics, vol. 41, No. 5, Oct. 1994, 7 pages.

* cited by examiner

ELECTRIC MACHINE WITH A VARIABLE STATOR GEOMETRY CONFIGURED FOR ADJUSTABLE POWER LOSS

CROSS REFERENCE TO RELATED APPLICATIONS

This application is a 35 U.S.C. § 371 national stage application of PCT International Application No. PCT/EP2021/062624 filed on May 12, 2021, the disclosure and content of which is incorporated by reference herein in its entirety.

TECHNICAL FIELD

The present disclosure relates to heavy-duty vehicles such as semi-trailer vehicles for cargo transport, and in particular to electrically powered vehicles. Although the present disclosure will be described mainly with respect to semi-trailer vehicles and trucks, the present disclosure is not restricted to this particular type of vehicle but may also be used in other types of vehicles.

BACKGROUND

A heavy-duty vehicle, such as a truck or semi-trailer vehicle, normally comprises a service brake system based on friction brakes. Friction brakes, such as disc brakes or drum brakes, are highly efficient in generating braking torque. However, if the friction brakes are used too intensively, a phenomenon referred to as brake fading may occur, which is why friction brakes are not suitable for prolonged periods of use that may, e.g., occur when driving downhill for an extended period of time. Brake fading is caused by a build-up of heat in the braking surfaces and leads to significantly reduced braking capability. To avoid brake fading, heavy-duty vehicles often comprise auxiliary brakes capable of endurance braking, such as engine brakes and various retarder systems.

An electric machine can also be used to slow down a vehicle. The electric machine may then act as a generator which converts the kinetic energy from the vehicle into electrical energy. This electrical energy can be fed to an energy storage system (ESS) such as a rechargeable battery or the like, resulting in an overall increase in energy efficiency of the vehicle. Surplus energy from regenerative braking can also be fed to a brake resistor where it is converted into heat.

Electric machines (EM) do not suffer from brake fading, but since the combined energy absorption capability of the ESS and any brake resistors is limited, the electric machine may still not be able to perform endurance braking for prolonged periods of time. Thus, either additional means for braking need to be installed in the vehicle, or the requirements on the electrical energy system of the vehicle must be over-dimensioned to support endurance braking, which is undesired.

US 2008/0246430 A1 discloses an EM design where the output current from the EM during regenerative braking can be adjusted by displacing the rotor axially relative to the stator. US 2019/0207447 A1 instead proposes to change the magnetic properties of the rotor in an EM to adjust its output current during regenerative braking. However, despite the work done so far, there is a continuing need for improvements in order to realize the full potential of electrically powered heavy-duty vehicles.

SUMMARY

It is an object of the present disclosure to provide improved electric machines and also improvements in the control of electric machines which facilitate robust and efficient endurance braking by heavy-duty vehicles. This object is at least in part obtained by an electric machine for a heavy-duty vehicle. The electric machine comprises a stator and a rotor separated by an air gap, where the stator comprises a stator reconfiguration device arranged to modify a magnetic property of the material in the stator. The stator is arranged to be mechanically reconfigurable by the stator reconfiguration device to allow control of magnetic flux in the air gap.

This configuration allows a control unit arranged external to the electric machine to adjust the power losses of the electric machine (EM) to a desired power loss setting. If there is ample room in an energy storage system (ESS), then the power losses can be reduced down to a minimum in order to, e.g., recuperate as much energy as possible during braking. However, if the energy storage system is about to reach full state of charge, then the power losses can be increased in order to reduce the energy output from the electric machine during braking. The mechanical arrangements disclosed herein can be adjusted regularly by an actuator controlled by a control unit. The stator may be axially fixed with respect to the rotor. This allows for a more robust actuator arrangement which can be used to adjust power losses in the electric machine in a more reliable manner compared to the case where the stator is arranged movable in the axial direction with respect to the rotor.

This proposed electric machines allow for regulating the output energy during endurance braking by a heavy-duty vehicle dynamically to match the energy absorption capabilities of the energy storage system of the vehicle. Thus, the endurance capability of the vehicle is extended, which is an advantage. The regulation of efficiency level can be performed in real-time, or in a predictive manner to ensure that both current and future endurance braking capability of the vehicle is satisfactory.

If the ESS is in a state where it can absorb energy then the EM is configured to output current which can be used, e.g., to replenish batteries in the ESS. However, if the ESS is not able to absorb maximum output current from the EM in some vehicle motion scenario, then the energy output from the EM can be reduced by increasing the power loss level at which the EM is operating, which then instead increases the heat generation in the EM. It is an advantage to be able to adjust EM energy output in this manner to facilitate endurance braking, since the energy absorption demands on other vehicle components can be reduced, leading to a less complicated and more cost-effective overall vehicle energy system. Also, since the efficiency level of the EM is modulated in dependence of driving scenario, there is no significant performance penalty on the energy efficiency of the vehicle.

According to aspects, the stator reconfiguration device comprises a first section and second sections formed in different materials, where the different materials have different magnetic permeability properties, such that an orientation of the stator reconfiguration device relative to the stator influences the magnetic property of the stator. This way of controlling the magnetic flux in the air gap has been shown to be particularly effective and can be realized in a mechanically robust manner with reasonably low cost, which is an advantage. The first section can for instance be formed in a material with high magnetic permeability such as soft magnetic composite or laminated magnetic steel, and where the second section which is formed in a low magnetic permeability material such as copper or aluminum.

According to aspects, the stator reconfiguration device is a rod extending in a longitudinal direction axially along the stator, where the rod is axially divided into first and second sections, and where the two sections are associated with different magnetic permeabilities. The stator reconfiguration device can then be rotatably mounted about the longitudinal axis to allow control of the magnetic flux in the air gap by rotation of the stator reconfiguration device. This version of the stator reconfiguration device is also relatively easy to implement in a reliable and robust manner and has been found to yield good results in terms of magnetic flux control.

According to aspects, the stator reconfiguration device is a rod extending in a longitudinal direction axially along the stator, where the rod is divided into first and second sections by a plane extending transversal to the longitudinal direction of the rod, where the two sections are associated with different magnetic permeabilities, and where the stator reconfiguration device is slidably mounted in the axial direction relative to the stator to allow control of magnetic flux in the air gap by longitudinal displacement of the rod. This is an alternative to the options discussed above and associated with the same advantages.

According to aspects, the stator reconfiguration device comprises one or more conduits for passing a cooling medium through the stator reconfiguration device. These conduits improve the cooling capacity of the electric machine, and therefore allows for higher currents to pass through the components of the electric machine. The high currents, in turn, means that more power loss can be supported, which is an advantage.

According to aspects, the stator reconfiguration device comprises at least a first section and a second section formed in different materials, where the different materials have respective high and low relative magnetic permeability properties, and where the one or more conduits are arranged in the section associated with the low magnetic permeability property. This way the conduits are arranged where they are needed the most, i.e., in a location where heat generation can be expected.

According to aspects the electric machine comprises a stator geometry control unit arranged to control the orientation of the stator reconfiguration device based on a received control signal.

There are also disclosed herein vehicle control units, vehicles, and methods associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

With reference to the appended drawings, below follows a more detailed description of embodiments of the present disclosure cited as examples. In the drawings.

DETAILED DESCRIPTION

Figure 1:
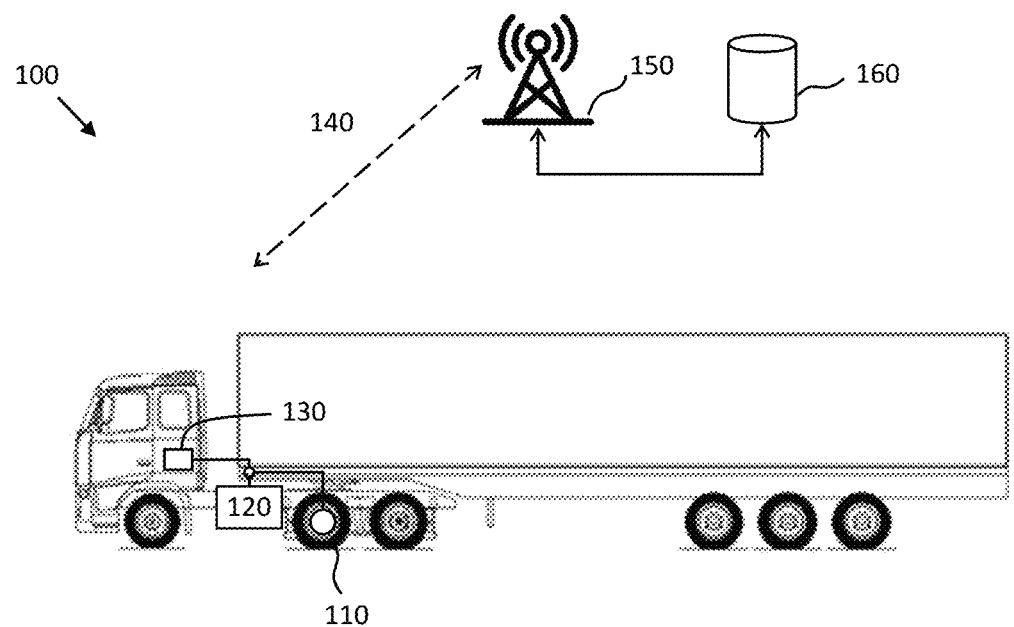
FIG. 1 shows an example heavy-duty vehicle.

The present disclosure will now be described more fully hereinafter with reference to the accompanying drawings, in which certain aspects of the present disclosure are shown. This disclosed subject matter may, however, be embodied in many different forms and should not be construed as limited to the embodiments and aspects set forth herein; rather, these embodiments are provided by way of example so that this disclosure will be thorough and complete, and will fully convey the scope of the present disclosure to those skilled in the art. Like numbers refer to like elements throughout the description.

It is to be understood that the present disclosure is not limited to the embodiments described herein and illustrated in the drawings; rather, the skilled person will recognize that many changes and modifications may be made within the scope of the appended claims.

FIG. 1 illustrates an example heavy-duty vehicle 100 for cargo transport. The vehicle combination 100 comprises a truck or towing vehicle configured to tow a trailer unit in a known manner, e.g., by a fifth wheel connection. Herein, a heavy-duty vehicle is taken to be a vehicle designed for the handling and transport of heavier objects or large quantities of cargo. However, a heavy-duty vehicle could also be a vehicle designed for use in construction, mining operations, and the like. It is appreciated that the techniques and devices disclosed herein can be applied together with a wide variety of electrically powered vehicle units, not just that exemplified in FIG. 1. In particular, the techniques disclosed herein are also applicable to, e.g., rigid trucks and multi-trailer electric heavy-duty vehicles comprising one or more dolly vehicle units.

The vehicle 100 is an electrically powered vehicle comprising one or more electric machines (EM) 110. The one or more EMs are arranged to generate both positive and negative torque, i.e., to provide both propulsion and braking of the vehicle 100. The vehicle 100 also comprises an energy storage system (ESS) 120 configured to power the one or more EMs. The ESS 120 may comprise a battery pack and potentially also a fuel cell (FC) stack arranged to generate electrical energy from a hydrogen storage tank on the vehicle 100 (not shown in FIG. 1). The ESS optionally also comprises a brake resistance arranged to dissipate surplus energy which the electrical energy storage devices on the vehicle 100 cannot accommodate.

A vehicle control unit 130 is arranged to monitor and control various vehicle operations and functions. The vehicle control unit is, e.g., arranged to monitor and control the ESS 120 as well as the one or more EMs 110, and optionally also the operation of the FC stack. The vehicle control unit 130 may also comprise higher layer control functions such as vehicle route planning and may have access to geographical data comprising height profiles of different planned vehicle routes and the like, as well as positioning data indicating a current location of the vehicle 100, which can be determined from, e.g., a global positioning system (GPS) receiver.

The vehicle 100 optionally comprises a wireless communications transceiver arranged to establish a radio link 140 to a wireless network 150 comprising a remote server 160. This way the control unit 130 may access the remote server 160 for uploading and downloading data such as the geographical data mentioned above comprising height profiles of different planned vehicle routes. Notably, the vehicle 100 may store measurement data such as amounts of regenerated energy by the one or more EMs 110 at various geographical locations and along different vehicle routes in local memory or at the remote server 160. The vehicle control unit 130 may also query the remote server for information about previously experienced amounts of regenerated energy, and/or temperature increases in various vehicle components along a given route, by the same vehicle or by some other vehicle having travelled along (parts of) the same route.

The vehicle control unit 130 may furthermore be arranged to obtain data indicative of an expected rolling resistance for a given route, either from manual configuration or remotely from the remote server 160. The rolling resistance of the vehicle 100 will affect the energy consumption of the vehicle as it traverses a route. For instance, a gravel road is likely to require more energy compared to a smoother asphalt freeway. Also, friction and air resistance will reduce the requirements on generating negative torque during downhill driving.

It is required to be able to brake the vehicle 100 as it travels down steep long hills and the like, where friction brakes risk onset of brake fading. The EMs 110 on the vehicle 100 may, as mentioned above, be used to generate braking torque. Electrical energy from the EMs generated during braking can then be fed to the ESS as long as the ESS can absorb the power, resulting in recuperated energy and a more energy efficient vehicle operation, which is an advantage. However, when the batteries of the ESS are fully charged, no more energy can be absorbed. Furthermore, there may be a limit on maximum current or voltage that can be fed to the batteries of the ESS when charging. If the batteries in the ESS cannot accept all of the output energy from the electric machines, surplus energy can be fed to the brake resistor which then dissipates the surplus energy as heat. However, a brake resistor also has a maximum amount of power it can absorb since it will eventually get too hot. Furthermore, there is normally a peak power capability of the brake resistor, i.e., there may be a limit on maximum current or voltage that can be fed to the brake resistor.

If the battery pack on the vehicle 100 is fully charged and the brake resistor has reached a maximum allowable temperature, there is no safe way of dispersing power generated from the electric machine during braking. This problem can be alleviated somewhat by over-dimensioning the brake resistor, but this solution is not desired since it drives both cost and component footprint.

The magnetic flux through a surface is the surface integral of the normal component of the magnetic field B over that surface. It is usually denoted $\phi$ or $\phi B$. The SI unit of magnetic flux is the Weber (Wb; in derived units, volt-seconds), and the CGS unit is the Maxwell.

Magnetic permeability is a measure of magnetization that a material obtains in response to an applied magnetic field. Permeability is typically represented by the Greek letter $\mu$. The reciprocal of magnetic permeability is magnetic reluctivity. In SI units, permeability is measured in Henries per meter (H/m), or equivalently in Newtons per ampere squared (N/A$^2$). The permeability constant $\mu_0$, also known as the magnetic constant or the permeability of free space, is the proportionality between magnetic induction and magnetizing force when forming a magnetic field in a classical vacuum. A closely related property of materials is magnetic susceptibility, which is a dimensionless proportionality factor that indicates the degree of magnetization of a material in response to an applied magnetic field.

An electrical motor is normally designed for operation at maximum efficiency, i.e., minimum power loss, meaning that maximum output power is generated during regenerative braking in order to recuperate as much energy as possible during downhill driving. However, there are techniques available for increasing the power losses incurred in the EM in a controlled manner during operation, which allows the power loss in the EM to be adjusted to a desired level. An electric machine used to generate braking torque which is operated in a less energy efficient mode of operation will generate more heat and less output current compared to an electric machine that is operated at maximum efficiency.

The generated torque by an EM is a function of the cross product between the current vector of the EM and the magnetic flux in the air gap formed between stator and rotor. It is therefore possible to adjust generated torque by altering the magnetic flux in the air gap. This adjustment of magnetic flux can be achieved by mechanically modifying the geometry of the EM, whereby the power losses in the EM can be manipulated. US 2008/0246430 A1 disclosed an EM design where the output current from the EM during regenerative braking can be adjusted by displacing the rotor axially relative to the stator. This axial adjustment has an impact on the magnetic flux in the air gap formed between the stator and rotor, and therefore represents a way to adjust the power loss of the EM during operation. However, it is relatively complicated to robustly offset the stator and rotor axially in this manner. US 2019/0207447 A1 instead proposed to change the magnetic properties of the rotor in an EM to adjust its output current during regenerative braking. However, since the rotor is not stationary, control of its internal components in this manner is also rather complicated, and most likely also associated with an increased cost.

The present disclosure instead proposes to adjust the geometry of the stator in order to change its magnetic properties during operation, and in this way control the power losses in the EM. There are at least two possibilities for mechanically modifying the magnetic properties of the stator: Increasing the stator and/or rotor losses by increasing the eddy currents in the EM, which can be achieved by changing parts of the stator structure from laminated steel (or soft magnetic composite) to solid steel, and/or changing the magnetic flux in the stator. A reduction in the magnetic flux needs then to compensated with higher current to achieve the same torque and increasing the current results in higher power losses. Thus, by making parts of the stator flexible, the power losses in the EM can be manipulated close to real-time.

Apart from mechanically modifying the magnetic properties of the stator, it has also been realized that there is a control freedom associated with electric machines which allow most electric machines to be operated at a reduced efficiency. The general principles of such sub-optimal energy efficiency electric machine control are described in, e.g., GB2477229B and also in US 2017/0282751 A1.

In addition to presenting techniques for modifying the magnetic properties of the stator during EM operation, the present disclosure also builds on the previous work in the prior art by providing a control mechanism and a communications interface which allows the vehicle control unit 130 to balance electrical current output from the EM 110 during regenerative braking with a temperature increase in the EM during braking. In essence, the control unit 130 is, by the proposed technique, able to balance EM temperature increase with ESS energy absorption capability during extended periods of down-hill driving, thereby providing an improved endurance braking capability for the heavy-duty vehicle 100 and thus a reduced need for over dimensioning the components of the vehicle 100. The control signaling between the vehicle control unit and the one or more electric machines on the vehicle is versatile and allows for an efficient and robust control of the electric vehicle propulsion system. According to one implementation, the control unit 130 also balances the current output of the EM during driving in a predictive manner. For instance, suppose a route involves an initial flat stretch of road followed by a long downhill section. The control unit may then mechanically and/or electrically configure the EM in an energy inefficient mode of operation to consume more power during the drive on the flat stretch of the route, in order to ensure sufficient endurance braking capability during the long downhill part of the route.

It is appreciated that the configuration of EM efficiency level is equivalent to the configuration of a power loss level of the EM. As will be explained in the following, the techniques disclosed herein are applicable also when no torque is generated by the EM, in which case a definition of efficiency may be cumbersome. Thus, herein, a power loss level is the same thing as an efficiency level, although the term power loss level is preferred when discussing EM operation involving zero torque.

Figure 2:
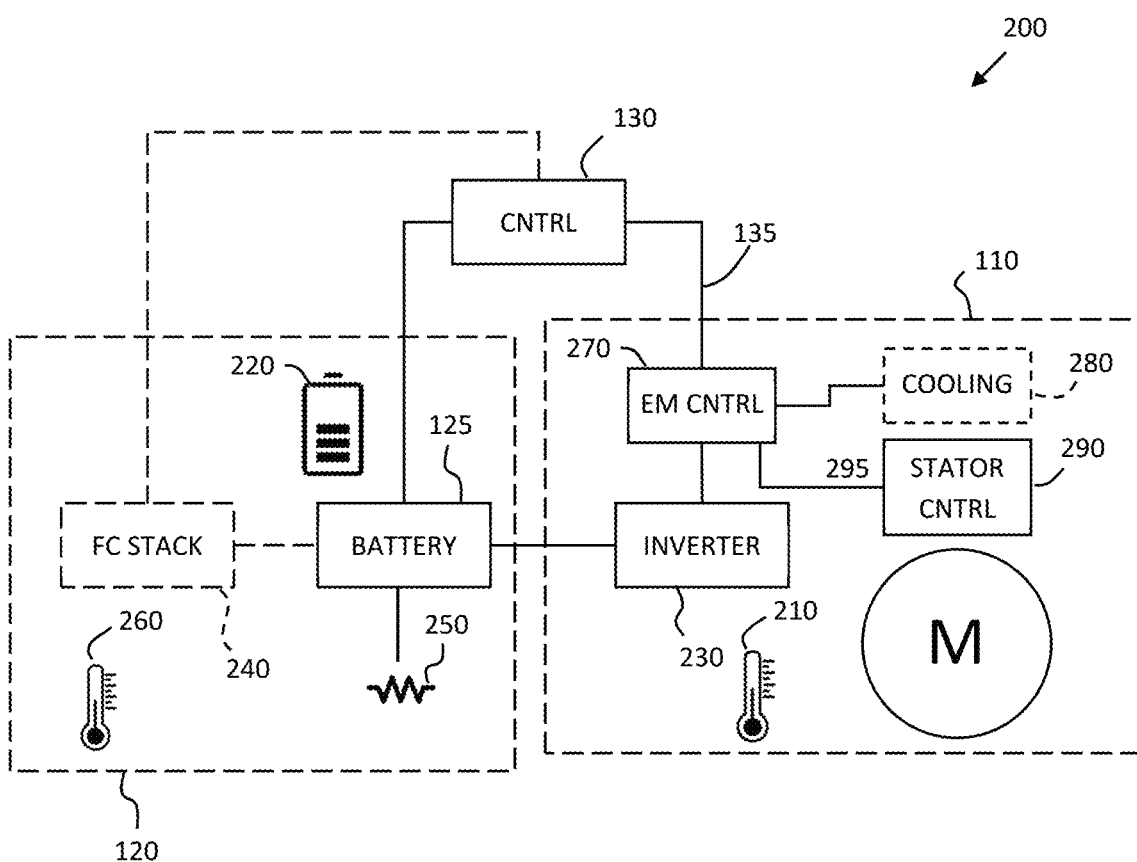
FIG. 2 schematically illustrates an electric machine control system.

FIG. 2 illustrates an example vehicle propulsion system 200 comprising an EM 110, an ESS 120 and a vehicle control unit 130. The EM 110 here comprises an EM control unit 270 arranged to control the operation of an inverter 230 which drives the electric machine. The EM is associated with an EM temperature 210, which may relate to, e.g., a temperature of the stator windings and/or to other components in the EM. It is appreciated that the different components of an electric machine are associated with a specification regarding maximum temperatures. If those temperatures are exceeded, then the respective EM components risk malfunction or will at least suffer an increased wear. The EM control unit 270 is arranged to communicate with the vehicle control unit 130 over a control interface 135. Various control messages may be exchanged over this interface 135. For instance, the vehicle control unit 130 may use the interface 135 to configure a degree of efficiency, or a power loss level of the EM subsystem 110. The EM sub-system 110 may also use the interface 135 to report back capabilities to the vehicle control unit 130. Thus, advantageously, if the vehicle propulsion system comprises more than one EM, or even more than one EM subsystem, such as different EM subsystems on different vehicle units, then the vehicle control unit 130 may communicate with the EM subsystems and balance regenerative braking efficiency in dependence of their respective capabilities and energy absorption capabilities of the vehicle ESS 120.

The EM subsystem 110 may, as mentioned above, be operated at varying degrees of efficiency, using either mechanical adjustments in the EM or variation in the control of the EM drive circuit. An EM used for propulsion of a vehicle 100 is normally operated at maximum efficiency, which means that a maximum output current always results from applying negative torque, in order to recuperate as much energy as possible. However, as explained in GB 2477229 B and US 2017/0282751 A1, the currents in the stator windings of the EM can be controlled such that this efficiency is reduced significantly. Furthermore, it has been realized that this efficiency can be controlled by the control unit 130 in real time, or at least close to real time, in dependence of the energy efficiency capability of the EM 110 and in dependence of the energy absorption capability of the ESS 120. This way the control unit 130 can obtain both an energy efficient operation by the vehicle 100 by maximizing energy efficiency as long as the ESS 120 is able to absorb the generated output current during regenerative braking, and also an increased capability of endurance braking if needed, by reducing the efficiency of the EM 110, i.e., increasing the EM power loss, thereby reducing output energy from the EM during regenerative braking and instead raising the internal temperature of the EM 110. In fact, a power loss can even be configured at zero torque, in which case the EM start to act like a brake resistance which dissipates energy from the ESS.

In addition to the control of currents in the stator windings of the EM, it is also possible to mechanically modify a magnetic property of the stator by means of an actuator. This actuator control is indicated as a stator geometry control unit 290 connected to the EM control unit 270 in FIG. 2.

Advantageously, an EM where the efficiency level is configurable in this manner also comprises a higher capacity cooling system, such as an oil-based cooling system with a sufficiently sized heat exchanger and fan. The higher the cooling capacity of the EM, the less power efficient it can be for longer periods of time. In fact, with a sufficiently dimensioned cooling system, the EM can be designed to provide endurance braking for an unlimited duration of time, at least for certain vehicle maximum load and the like. The endurance braking capability of the EM can be further increased if the techniques involving stator geometry reconfiguration is combined with the techniques involving control of stator winding currents. By balancing the two methods of EM power loss control, the rate of temperature increases in the EM for a given braking torque can be reduced.

The cooling of the EM can also be adjustable, e.g., by adjusting a fan speed or flow rate of cooling liquid to provide additional cooling when the EM is configured in an energy inefficient mode of operation, i.e., at high power loss. Thus, according to some aspects, the control unit 130 is configured to control a variable cooling 280 of the EM 110 in dependence of the efficiency level at which the EM is configured, such that increased cooling is performed when the EM is operated in an energy inefficient mode of operation, that is, at a high power loss setting. Advantageously, this cooling system can be combined with the mechanism for modify the magnetic properties of the stator, as will be discussed in more detail below. The variable cooling 280 of the EM 110 can also be configured to operate in a predictive manner. This means that the variable cooling system is operated in anticipation of an increase in temperature, e.g., if it is known that an endurance braking function of the vehicle 100 will be used in the near future, since there is a long downhill section of road up ahead of the vehicle along its planned route.

The ESS 120 of the vehicle propulsion system 200 comprises a battery pack 125 connected to an optional brake resistor 250 for dissipating surplus energy. An optional FC stack 240 is also indicated as comprised in the ESS 120. The ESS 120 is associated with a state of charge (SoC) 220 indicating, e.g., how much charge that is currently carried by the battery pack. Of course, one or more components of the ESS 120 may also be associated with a temperature 260, where it is appreciated that some components may risk permanent damage or at least temporarily reduced function is overheated. The temperature of the brake resistor 250 can be expected to vary with surplus energy. If it is used to dissipate large amounts of energy, then it may reach critical temperatures, which is of course undesired. The FC stack 240 is normally difficult to turn off and re-start since it takes time to do this without damaging the FC stack. Thus, it is preferred to always generate some power by the FC stack 240, even if the ESS is close to full SoC and the vehicle is driving downhill. One advantage of the techniques disclosed herein is that the efficiency level of the EM subsystem 110 can be configured at a constant power loss value corresponding to the minimum output power from the FC stack, thus compensating for the energy contribution by the FC stack.

An electric machine, such as the EM 110, comprises a stator and a rotor which are separated by an air gap, where the rotor is arranged to rotate together with the motor axle. Herein, the motor axle will be generally used as reference axis, and its extension direction will be referred to as the axial direction, denoted as A in the Figures. The EMs considered herein have stators which are axially fixed with respect to the rotor, i.e., the EMs discussed herein are different from the type of EMs discussed in US 2008/0246430 A1 where the rotor is axially displaced relative to the stator in order to control the efficiency of the electric machine.

The stators of the herein disclosed EMs comprise one or more stator reconfiguration devices which are arranged to modify a magnetic property of the stator. Thus, the EMs differ from those discussed in US 2019/0207447 A1 where it is proposed to change the magnetic properties of the rotor instead of the stator to adjust EM efficiency and/or power loss level.

The stator 510 in the current proposal is mechanically reconfigurable by the stator reconfiguration device to allow control of magnetic flux in the air gap. This means that an actuator is used to change the physical orientation of the stator reconfiguration device relative to the stator, and thereby change the power loss level of the EM. This mechanical reconfiguration of the stator can advantageously be combined with control of the stator winding currents in order to obtain an even better control of the power loss in the EM.

The electric machine 110 may, as shown in FIG. 2, comprise a stator geometry control unit 290 arranged to control the physical orientation of the stator reconfiguration device based on a received control signal 295. This control signal 295 will then determine the current energy efficiency, i.e., the current power loss level at which the EM 110 is operating.

The EM 110 may also comprise a temperature sensor 210 arranged to measure a temperature of the stator reconfiguration device. Thus, the EM control unit 270 may report current temperatures up to the vehicle control unit 130, which may adapt its control of the vehicle 100 in dependence of the temperatures of the stator reconfiguration devices on the vehicle 100. By allowing a controlled increase in temperature, more current can be allowed to flow, which results in increased power loss.

Figure 3:
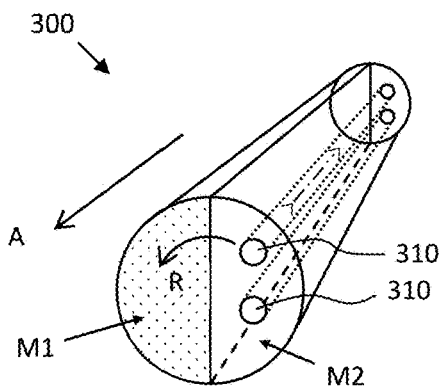
FIGS. 3-4 show example stator reconfiguration devices.
Figure 4:
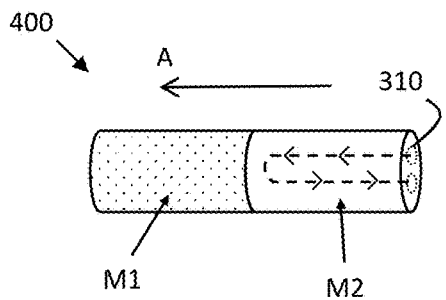

FIGS. 3 and 4 show two example stator reconfiguration devices 300, 400 which can be used to mechanically modify a magnetic property of the stator in the EM 110, e.g., its magnetic permeability in a certain place or the tendency for eddy currents to be generated at some location in the stator. The stator reconfiguration devices are arranged to be at least partially embedded into the stator, where they may affect the magnetic flux in the stator.

Figure 11:
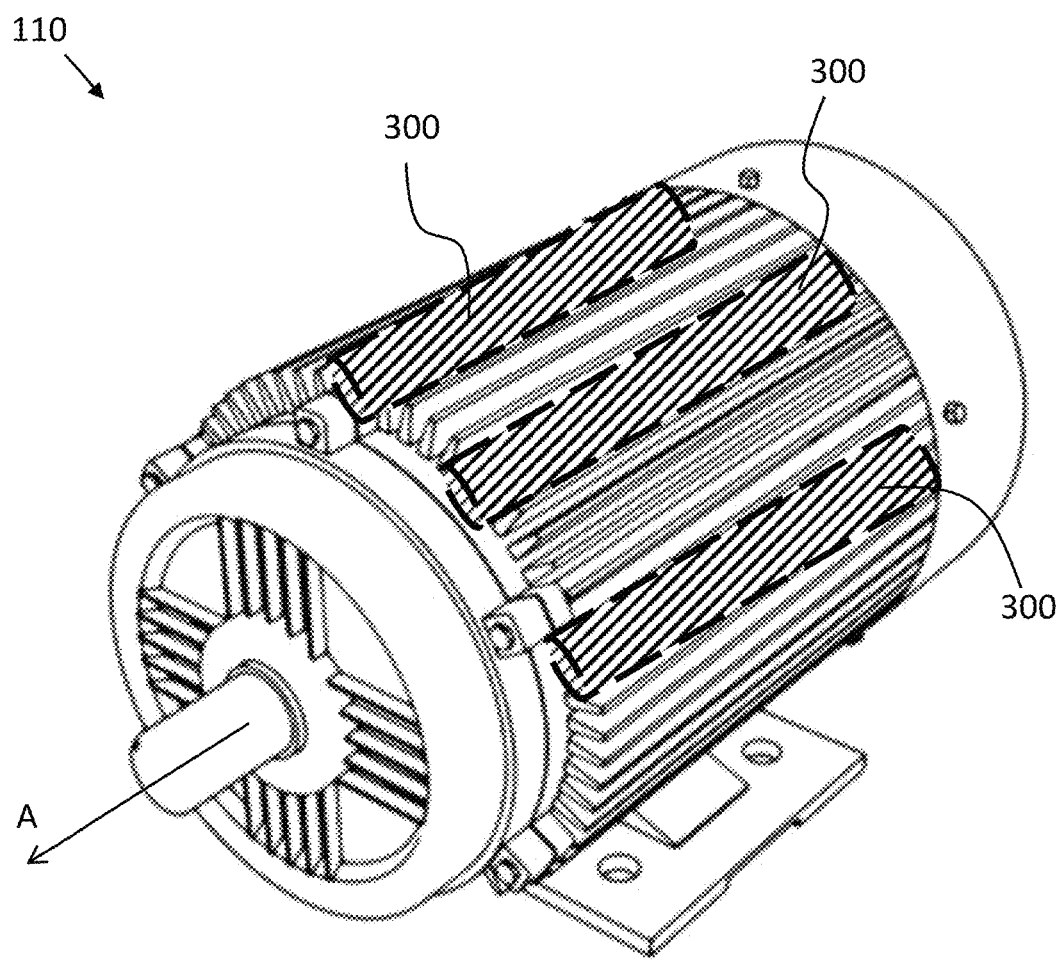
FIG. 11 shows an example electric machine.

FIG. 11 shows an example EM 110 comprising a plurality of stator reconfiguration devices arranged axially (A) in the stator.

Without loss in generality, each of the stator reconfiguration devices 300, 400 comprises two different materials denoted M1 and M2, with different respective magnetic permeabilities, where it is appreciated that more than two materials can be used in the stator reconfiguration devices. This means that a stator reconfiguration device can be moved relative to the stator, and in this way change the magnetic properties of the stator, which in turn will have an impact on the power loss in the EM 110. The stator reconfiguration device 300 in FIG. 3 is arranged to be rotated about its longitudinal axis, as indicated by the arrow R, which will change the material configuration in the stator if the rotation is performed relative to the stator, i.e., with the stator in a fixed position. Depending on the angle of rotation, a given material will be presented to one side. Put differently, the stator reconfiguration device 300 is in the form of a rod extending in a longitudinal direction axially A along the stator. The rod is divided axially into first and second sections, where the two sections are associated with different magnetic permeabilities, and where the stator reconfiguration device 300 is rotatably mounted about the longitudinal axis to allow control of the magnetic flux in the air gap by rotation of the stator reconfiguration device 300.

The stator reconfiguration device 400 in FIG. 4 is instead divided transversally to its longitudinal axis, such that the first material M1 forms one end of the rod and the other material M2 forms the opposite end of the rod. With this configuration, the axial position of the stator reconfiguration device 400 relative to the stator will affect the magnetic properties of the stator, and thus impact the power loss in the EM 110. In other words, the stator reconfiguration device 400 can be slid back and forth in the axial direction, in order to change the magnetic properties of the stator. In other words, the stator reconfiguration device 400 may also be formed as a rod extending in the longitudinal direction axially A along the stator, where the rod is divided into first and second sections by a plane extending transversal to the longitudinal direction of the rod, and where the two sections are associated with different magnetic permeabilities. The stator reconfiguration device 400 can be slidably mounted in the axial direction A relative to the stator 510 to allow control of magnetic flux in the air gap by longitudinal displacement of the rod.

Generally, the stator reconfiguration devices 300, 400 disclosed herein may comprise first and second sections formed in different materials M1, M2, where the different materials have different magnetic permeability properties, such that an orientation of the stator reconfiguration device 300, 400 relative to the stator influences the magnetic property of the stator. The first section can be formed in a material with high magnetic permeability such as soft magnetic composite or laminated magnetic steel, and the second section can be formed in a low magnetic permeability material such as copper or aluminum. Of course, other high permeability materials are known, as well as other low permeability materials. By at least partially embedding a stator reconfiguration device into the stator, it can be used to control the magnetic flux in the air gap between the stator and rotor.

It is appreciated that the stator reconfiguration device 400 need not be shaped as a cylinder, since it does not rotate but slide relative to the stator. A rectangular cross section shape would also be possible for instance, or any cross section shape which allows the stator reconfiguration device 400 to slide axially relative to the stator.

Figure 5A:
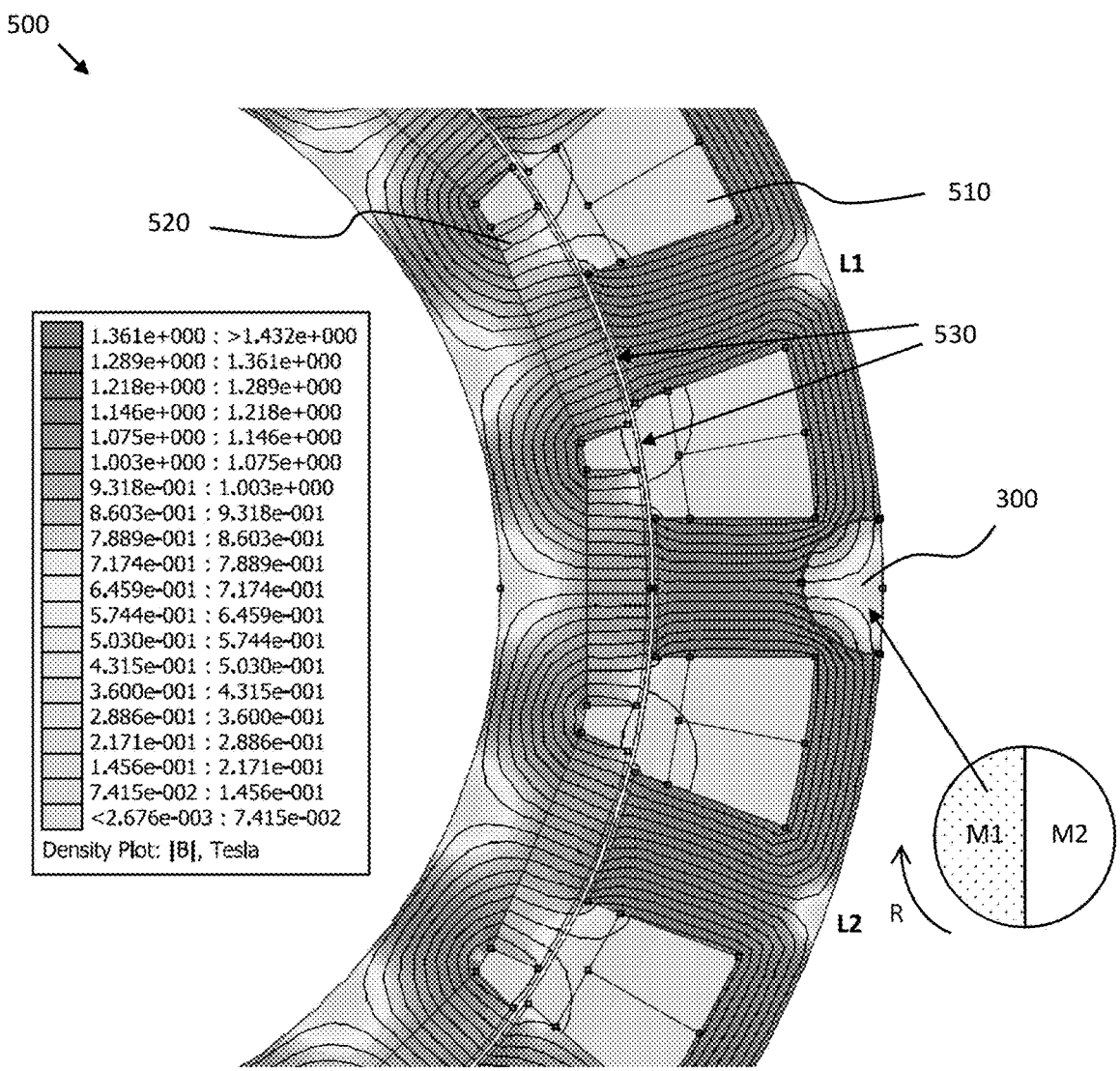
FIGS. 5A-D illustrate impact on magnetic flux by stator reconfiguration.
Figure 5B:
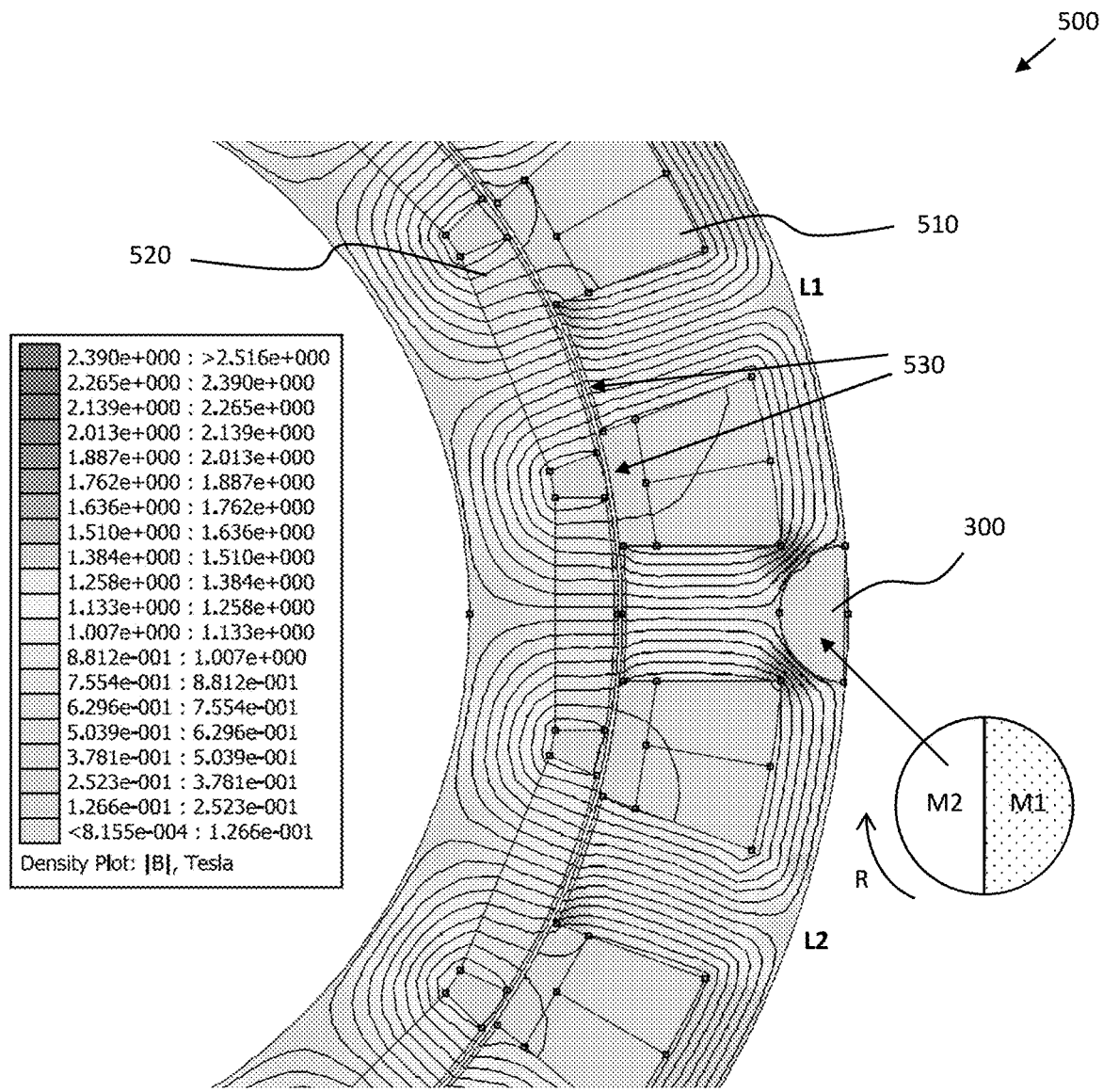

FIGS. 5A and 5B illustrate a practical example 500 of how the stator reconfiguration device 300 can be used to change the magnetic properties of the stator. FIG. 5A illustrates an EM comprising a stator 510 and a rotor 520 separated by an air gap 530, where a stator reconfiguration device 300 has been embedded into the stator radially outwards from the motor axle. The stator reconfiguration device 300 has been arranged rotatably embedded into the stator outer hull, where about half of the rod is inside the hull of the stator 510, and about half of the rod is outside the hull. Now, by rotating the stator reconfiguration device about its longitudinal axis, as indicated by the arrow R in FIGS. 5A and 5B, the rod will present a different material to the stator interior. In FIG. 5A the high magnetic permeability material M1 is presented towards the interior of the stator 510, while in FIG. 5B the low magnetic permeability material M2 is instead presented towards the interior of the stator 510. The effect on the magnetic flux in the air gap can be seen in the Figures from the insert scales: the magnetic flux in the air gap 530 is notably higher when the high magnetic permeability material M1 is presented towards the stator interior by the stator reconfiguration device 300 compared to when the material M2 is facing the interior of the stator.

Of course, the same effect can also be obtained if the stator reconfiguration device 400 is used instead and slid axially with respect to the stator, such that different magnetic permeability materials are embedded into the stator.

Figure 5C:
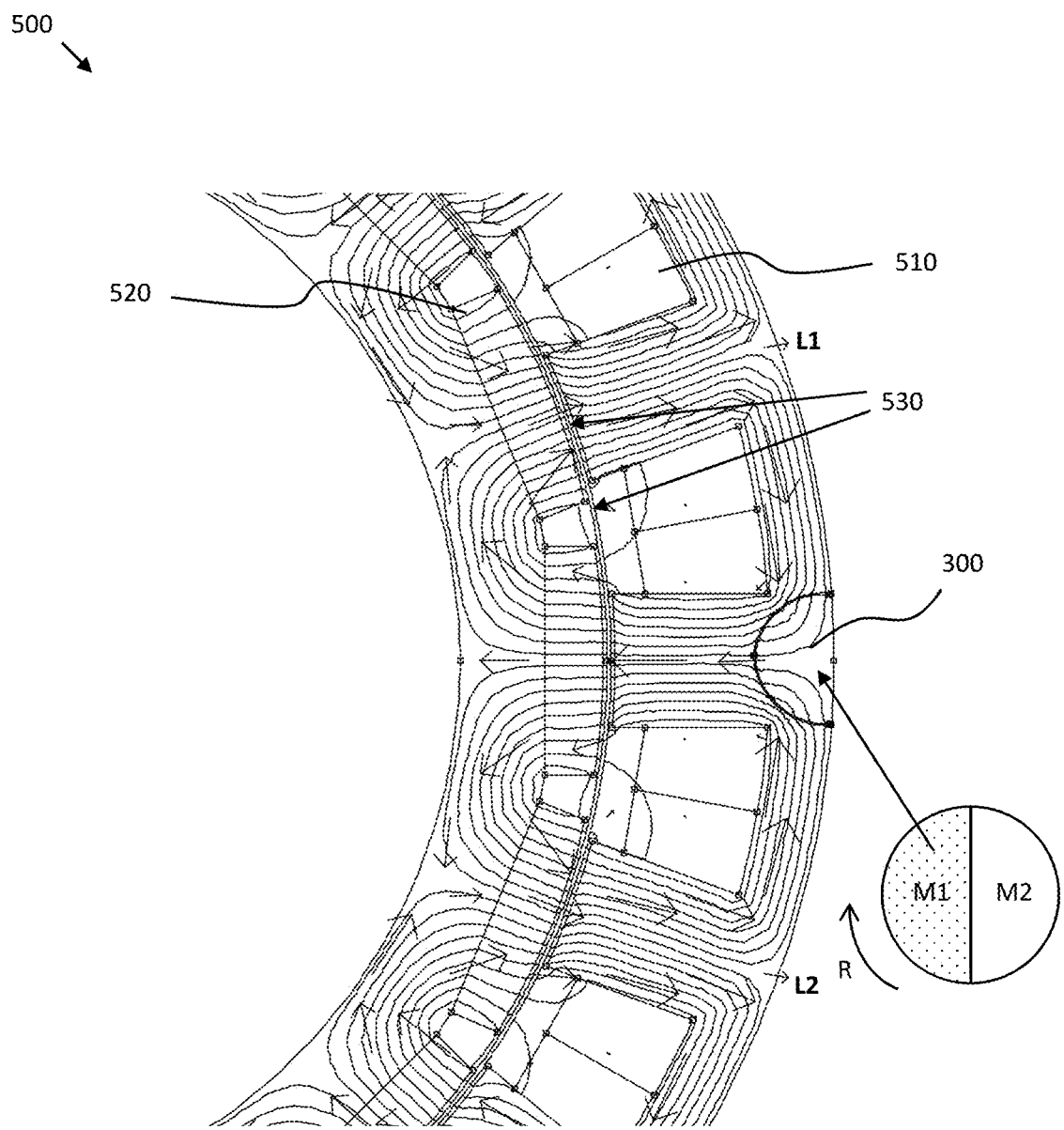

FIG. 5C shows the stator reconfiguration device from FIG. 5A without magnetic flux strength, and with flux direction indicated by the arrows.

Figure 5D:
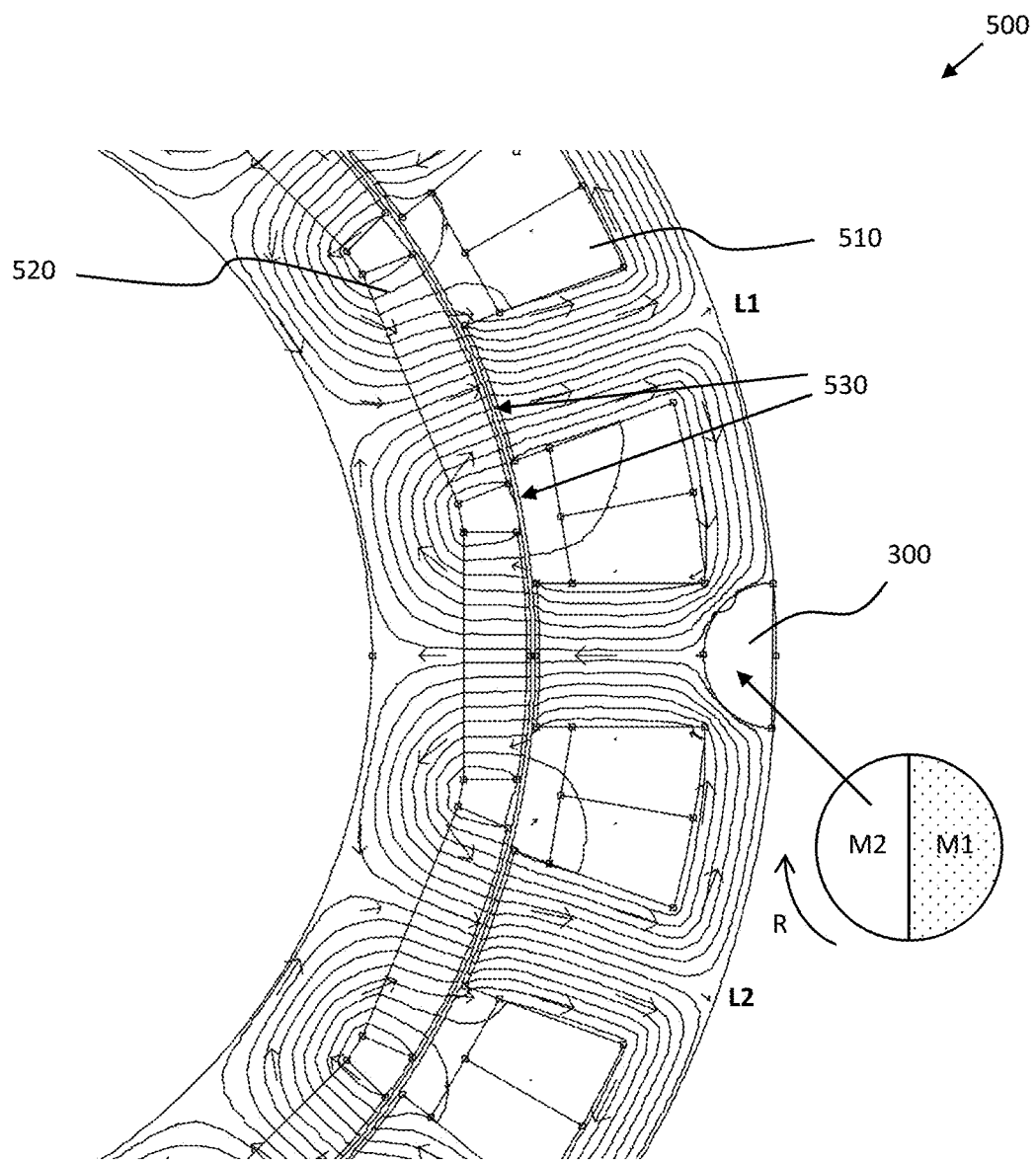

FIG. 5D shows the stator reconfiguration device from FIG. 5B without magnetic flux strength, and with flux direction indicated by the arrows.

As shown in FIGS. 3 and 4, the stator reconfiguration device 300, 400 may also comprise one or more conduits 310 for passing a cooling medium through the stator reconfiguration device. These cooling conduits allow for an efficient cooling of the EM since they are arranged close to the location where heat will be generated when the EM is operating in an inefficient mode of operation associated with high power loss. The cooling conduits may be formed in the low magnetic permeability material M2, where the need for cooling is the highest. In other words, the stator reconfiguration device 300, 400 comprises first and second sections formed in different materials M1, M2, where the different materials have respective high and low relative magnetic permeability properties, and where the one or more conduits are arranged in the section associated with the low magnetic permeability property.

Although the EM 110 comprising the stator reconfiguration devices 300, 400 provides advantages in its own right, additional benefits can be obtained if the variable power loss features of the EM is controlled by the vehicle control unit 130 in a way which fully exploits its possibilities. Towards this end, with reference also to FIG. 9, there is disclosed herein a vehicle control unit 130, 900 for controlling an EM 110 of a heavy-duty vehicle 100. The EM comprises a stator 510 and a rotor 520 separated by an air gap 530, where the stator 510 comprises a stator reconfiguration device 300, 400 as discussed above arranged to modify a magnetic property of the stator, whereby the stator 510 is mechanically reconfigurable by the stator reconfiguration device 300, 400 to allow control of magnetic flux in the air gap. The heavy-duty vehicle 100 also comprises an energy storage system (ESS) 120 as shown in FIG. 2, connected to the EM 110.

Figure 8:
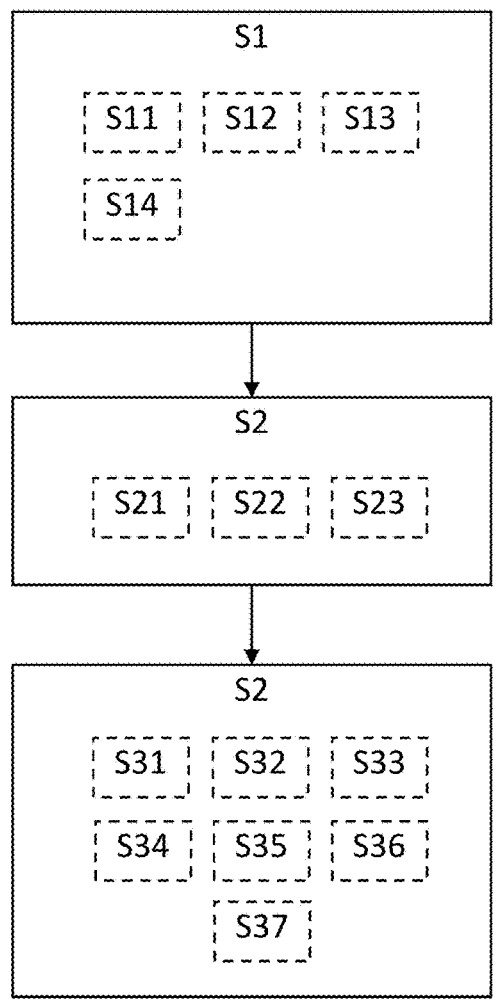
FIG. 8 is a flow chart illustrating a method.

With reference to the flow chart in FIG. 8, the control unit 130, 900 comprises processing circuitry 910 configured to obtain S1 an energy absorption capability of the ESS 120, determine S2 an amount of regenerated energy by the EM 110 during braking, and configure S3 an efficiency level of the EM 110 in dependence of the energy absorption capability of the ESS 120 and the amount of regenerated energy by the EM 110 during braking, at least in part by reconfiguring the stator reconfiguration device 300, 400.

Figure 6:
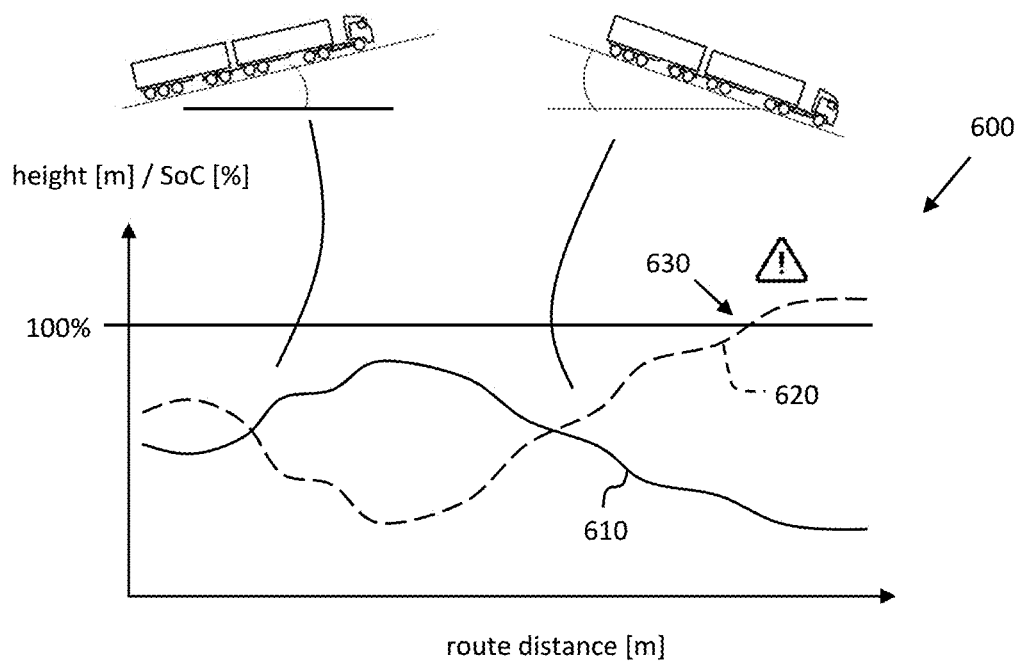
FIG. 6 illustrates energy consumption by a vehicle along a route.

According to some aspects, the processing circuitry 910 is configured to predict S22 an amount of regenerated energy from the EM 110 based on a planned route of the vehicle 100, and to control the stator reconfiguration device 300, 400 in dependence of the predicted amount of regenerated energy. FIG. 6 illustrates an example 600 of a height profile along a planned vehicle route (shown as a solid line). The dashed line in FIG. 6 illustrates an expected SoC along the same route for a nominal value of configured electric machine efficiency, i.e., a given orientation of the stator reconfiguration device. It can be seen that the SoC decreases in uphill sections of the route and increases in downhill sections of the route. At the end of this route the expected SoC exceeds 100%, which is undesired. This can be avoided by using the techniques of the present disclosure, i.e., by proactively increasing the power losses in the electric machine, whereby energy is instead converted into heat inside the EM subsystem instead of being output from the EM subsystem as electrical current. The expected SoC in FIG. 6 may be determined from the current energy absorption capability of the ESS and the expected energy generation from regenerative braking. The estimated energy generation (in Joules and/or Watts) from regenerative braking in a given driving scenario for different power loss configurations can be tabulated beforehand by experimentation and/or mathematical analysis which may involve computer simulation. However, additional advantages can be obtained if the energy generation in different operating conditions is logged, perhaps in collaboration with other vehicle via the remote server 160. This way the accuracy of the estimated amount of energy that can be expected from regenerative braking in different driving conditions and with different energy efficiency settings of the EM systems on the vehicle 100 can be improved. For instance, if a given vehicle driving down a hill having a certain slope and carrying a given amount of cargo generates a certain amount of energy, then this amount and the driving conditions can be written to memory, and optionally communicated to the remote server 160. The next time the vehicle drives down a similar slope carrying a similar load, the estimate of generated energy will be more accurate. The vehicle may also download relevant data from the remote server 160 indicative of an expected behavior of the EM along some given route. Interpolation can of course be used to estimate energy generation for a scenario which resembles some already experienced scenarios. This way the estimate of the regenerative amount of energy for different configurations of electric machine energy efficiency is further improved since more data will be available.

The rolling resistance can, as mentioned above, also have an effect on the energy consumption of the EM as the vehicle 100 traverses a route. The rolling resistance can often be accurately predicted based on information related to the road properties, such as if the road is a gravel road or a smooth freeway. The rolling resistance is also at least partly a property of the vehicle 100, and its tires.

Interestingly, the vehicle may upload the "ESS SoC profile" 620 corresponding to travelled routes to the remote server 160. The remote server 160 can then store this information, an make it available for other vehicles. Thus, a vehicle planning a transport mission can query the remote server 160 to see if an ESS SoC profile is available for the planned route. If this is the case, then the vehicle can download the SoC profile from the remote server and use this SoC profile to plan EM efficiency level configuration for the duration of the route. his ensures that the vehicle maintains an endurance braking capability for the entire route.

According to some aspects, the processing circuitry 910 is configured to send S32 a control signal comprising a requested power loss level to an EM control unit 270 arranged to control the position of the stator reconfiguration device 300, 400 in dependence of the requested power loss level.

According to some other aspects, the processing circuitry 910 is configured to receive S34 a power loss capability report from the EM control unit 270.

FIG. 8 shows a flow chart which summarizes some of the methods discussed herein. There is disclosed a method performed in a vehicle control unit 130 for controlling an electric machine (EM) 110 of a heavy-duty vehicle 100 which comprises an energy storage system (ESS) 120 connected to the EM 110. The method comprises obtaining S1 an energy absorption capability of the ESS 120. This energy absorption capability of the ESS is likely to vary over time, and can be monitored by the control unit 130, e.g., by determining S11 a state of charge (SoC) 220 of a battery pack comprised in the ESS 120, by determining S12 a temperature of the battery pack comprised in the ESS 120, and/or determining S13 a temperature 260 of a brake resistor 250 comprised in the ESS 120. The relationship between energy absorption capability and these different parameters can be pre-configured at the factory when the vehicle 100 is assembled, e.g., as a look-up table or the like in a memory accessible from the control unit 130, and/or regularly provided as part of a software update. Energy absorption capability in terms of power may be limited by an upper power limit which depends on the design of the ESS, i.e., the rating of the components comprised in the ESS. The capability of the ESS in terms of power is normally also dependent on temperature. For instance, brake resistance temperature impacts energy absorption capability negatively, since a very hot braking resistance may not be able to absorb very much energy until it has cooled down again. The energy absorption capability in terms of energy amount is often a linear function of state of charge, where a nearly fully charged battery pack cannot absorb so much energy, and a nearly empty battery pack is able to absorb a significant amount of energy.

A retarder is a device used to augment some of the functions of primary friction-based braking system, usually on heavy-duty vehicles. Retarders serve to slow vehicles down or maintain a steady speed while traveling down a hill and help prevent the vehicle from "running away" by accelerating down the hill. They are not usually capable of bringing vehicles to a standstill, as their effectiveness diminishes as vehicle speed lowers. They are instead used as an additional "assistance" to slow vehicles, with the final braking done by a conventional friction braking system or a brake system based on electric machines. As the friction brake will be used less, particularly at higher speeds, their service life is increased. The braking capability of a retarder system is a function of the state of the retarder, such as its temperature. The method may furthermore comprise determining S14 a state, such as a temperature or other metric indicative of a braking capability, of a retarder system arranged to provide a braking torque to prevent acceleration by the heavy-duty vehicle 100. Various retarder systems are known, such as water retarders and oil retarders.

An increased accuracy in determining the energy absorption capability of the ESS can be obtained if the behavior of the ESS is monitored during vehicle operation, and the dependence between energy absorption capability and vehicle component state is recorded. For instance, the effect of temperature on the behavior of the ESS can be monitored and a record of energy absorption capability can be maintained, which can then be consulted if an energy absorption capability is to be determined in the future. Data related to energy absorption capability of the ESS can also be communicated to the remote server 160, which may then construct a model of ESS energy absorption capability to be shared with other vehicles of the same type or comprising the same type of ESS.

The method also comprises determining S2 an amount of regenerated energy by the EM 110 during braking. The amount of energy regenerated by the EM 110 during braking can of course be determined simply by measuring S21 the amount of regenerated energy by the EM 110. However, it is also possible to predict S22 the amount of regenerated energy from the EM 110 based on a planned route of the vehicle 100.

The methods may also comprise determining S23 a maximum amount of regenerated energy by the EM 110 based on a vehicle load and an endurance braking requirement of the vehicle 100. The vehicle 100 may, e.g., be required to be able to limit speed when driving downhill for longer distances, i.e., the vehicle may be associated with an endurance braking capability requirement. This requirement together with a minimum energy absorption capability of the vehicle ESS can be translated into a maximum allowable efficiency of the electric machines on the vehicle. The required longitudinal torque can be expressed as $$F_{x,req} = m_{GCW} a_{x,req} + 0.5\, C_d A_f \rho_{air} v_x^2 + g C_r m_{GCW} + m_{GCW} g \sin\left(a \tan\left(\frac{s}{100}\right)\right)$$

where $m_{GCW}$ is the vehicle gross combination weight, $a_{x,req}$ is the required retardation, $C_d A_f$ is the product of air drag coefficient Ca and vehicle front area $A_f$, $\beta_{air}$ represents air density, $v_x$ is the vehicle speed, g is the gravitational constant, $C_r$ is rolling resistance, and s is a slope percentage between 0 and 100. Using this equation, e.g., the required torque for a planned route can be obtained for nominal value of air resistance (or air drag coefficient, front area etc.). The required torque can in turn be used to determine the energy generation during downhill sections. In case the energy absorption capability of the ESS goes below the required level and/or if the capability of the EM in terms of minimum efficiency increases, then the vehicle control unit 130 may trigger a warning signal, or even prevent vehicle operation.

The method also comprises configuring S3 a power loss level or an efficiency level of the EM 110 in dependence of the energy absorption capability of the ESS 120 relative to the amount of regenerated energy by the EM 110 during braking. This may, e.g., be achieved by configuring S31 the efficiency level of the EM 110 as a D/Q setpoint determined under constraints of a desired motor torque and power loss level, as was discussed in, e.g., GB 2477229 B and US 2017/0282751 A1, and/or by mechanically configuring the stator reconfiguration devices discussed above in connection to FIGS. 3, 4, 5A and 5B. In this way, the vehicle control unit 130 balances the efficiency level of the electric machines on the vehicle 100 such that the amount of regenerated energy during downhill driving does not exceed the energy absorption capabilities of the vehicle ESS. As discussed above, the efficiency level of the EM 110 may be expressed in terms of a power loss in absolute or relative terms. An absolute measure of power loss may, e.g., be measured in watts (W), while a relative power loss level may be measured, e.g., in terms of a percentage with respect to maximum efficiency. It is appreciated that the techniques disclosed herein are applicable also when no torque is generated by the EM, where the EM still can be configured to draw power from the ESS.

The technique of configuring a power loss level or an efficiency level of the EM 110 in dependence of the energy absorption capability of the ESS 120 may involve a model and a calculation method to optimize the power losses of a permanent magnet synchronous electric machine with respect to some target performance criteria. The adjustment of efficiency level of an electric machine is a generally known technique and will therefore not be discussed in detail herein. We instead refer to examples from the literature for more details and implementation examples, e.g., GB2477229B and US 2017/0282751 A1.

The example circuit model and calculation method provide separation of the power losses associated with the winding power loss and core power losses for a machine, for different dc voltages and axle speeds. The algorithm calculates the current set-points in direct and quadrature dimension ($i_d$, $i_q$) that provides a certain power loss for a given torque request, dc voltage $U_{dc}$, maximum current $I_{max}$ and axle speed $\omega$.

Figure 10:
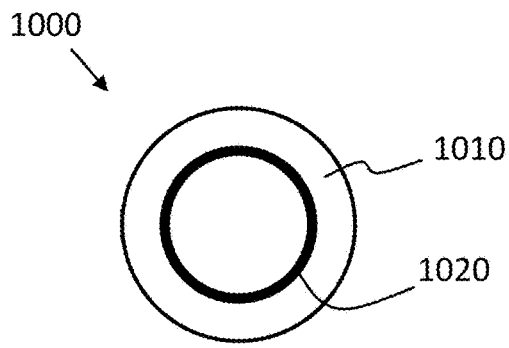
FIG. 10 shows an example computer program product.

The electric machine model is represented by the circuit model shown in FIG. 10. This model is an extension to the model provided by S. Morimoto, T. Ti, Y. Takeda, and T. Hirasa, in "Loss minimization control of permanent magnet synchronous motor drives," IEEE Transactions on Industrial Electronics, vol. 41, pp. 511-517, October 1994. The model comprises a leakage inductance $L_\lambda$, a mutual inductance: $L_m$, and two resistances r and $r_c$, where resistance r is associated with the $C_u$-losses (electric machine variable losses) and the resistance $r_c$ is associated with the core losses in the electric machine. There is also a back-EMF denoted here by e which is associated with the permanent magnetic flux of the electric machine. The voltage v is the applied voltage from the inverter, i.e., the motor drive circuit. Generally, below, subscript d denotes direct dimension and subscript q denotes quadrature dimension. Electric machine axle speed is denoted by $\omega$ and $\psi$ generally denotes flux.

The corresponding state space equation for machine state $\vec{x} = (i_{m^d}, i_{m^q}, i_d, i_q)$, with respect to the circuit model in FIG. 10, is given by following expression, $$\begin{cases} \dfrac{d\vec{x}}{dt} = A_c \vec{x} + B_c \begin{pmatrix} e \\ v_d \\ v_q \end{pmatrix} \\ \begin{pmatrix} i_d \\ i_q \end{pmatrix} = C_c \vec{x} \end{cases}$$

where ($i_{m^d}$, $i_{m^q}$) denotes direct and quadrature components of the current related to the mutual inductance $L_m$, ($i_d$, $i_q$) denotes direct and quadrature components of the current set-point, $e = \omega \psi_m$, $\psi_m$ is permanent magnet flux, and where the matrices in the synchronous to angular frequency dq-framework yields:

$$A_c = \begin{pmatrix} -\dfrac{r_c^d}{L_{m^d}} & \dfrac{\omega L_{m^q}}{L_{m^d}} & \dfrac{r_c^d}{L_{m^d}} & 0 \\ -\dfrac{\omega L_{m^d}}{L_{m^q}} & -\dfrac{r_c^q}{L_{m^q}} & 0 & \dfrac{r_c^q}{L_{m^q}} \\ \dfrac{r_c^d}{L_\lambda} & 0 & -\dfrac{r_c^d + r}{L_\lambda} & \omega \\ 0 & \dfrac{r_c^q}{L_\lambda} & -\omega & -\dfrac{r_c^q + r}{L_\lambda} \end{pmatrix}$$

$$B_c = \begin{pmatrix} 0 & 0 & 0 \\ -\dfrac{1}{L_{m^q}} & 0 & 0 \\ 0 & \dfrac{1}{L_\lambda} & 0 \\ 0 & 0 & \dfrac{1}{L_\lambda} \end{pmatrix}$$

$$C_c = \begin{pmatrix} 0 & 0 & 1 & 0 \\ 0 & 0 & 0 & 1 \end{pmatrix}$$

The electric torque T is given by the equation below, where $\psi_\delta$ denotes the airgap flux. Considering a machine with salient poles, the combination of setpoint currents $i_d$ and $i_q$ provides a degree of freedom to minimize the power loss in the machine for a certain torque. Here considering a three phase machine with pole number n.

$$T = i \times \psi_\delta = \dfrac{3n}{2}(\psi_\delta^d i_q - \psi_\delta^q i_d) = \dfrac{3n}{2}((\psi_s^d - L_\lambda i_d)i_q - (\psi_s^q - L_\lambda i_q)i_d) = \dfrac{3n}{2}(\psi_s^d i_q - \psi_s^q i_d) = \dfrac{3n}{2}(\psi_m i_q + i_d i_q(L_d - L_q))$$

where $\psi_s^d$ and $\psi_s^q$ denotes direct and quadrature components of the stator flux, $L_d = L_{m^d} + L_\lambda$ and $L_q = L_{m^q} + L_\lambda$. It is appreciated that, by incorporating saturation in the model, the inductances $L_d$, $L_q$ depend on the current set-point, i.e., $L_d(i_d, i_q)$, $L_q(i_d, i_q)$.

For a permanent magnet synchronous machine with salient poles, there are at least two degrees of freedom in choice of current references. Hence, it is possible to find a current reference vector that minimizes the power loss in each working point of operation unless operating on the boundary. The steady state power losses are defined in the following relation which also is the objective function for the optimization.

$$f(x) = \dfrac{3}{2}\left(r(i_d^2 + i_q^2) + r_c^d(i_d - i_{m^d})^2 + r_c^q(i_q - i_{m^q})^2\right)$$

where $$x = (i_{m^d}, i_{m^q}, i_d, i_q, v_d, v_q)$$

Hence, for a certain torque set-point $T^{sp}(\omega, U_{dc})$ in terms of the motor axle speed w and the voltage $U_{dc}$ behind the inverter, and a minimum power loss set-point $p^{sp}$, the optimization problem to be solved can be represented as $$\min_x f(x) \text{ subject to}$$
$$d(x) \leq 0$$
$$d_{eq}(x) = 0$$
$$l_b \leq x \leq u_b$$

where $l_b$ and $u_b$ are lower and upper bounds which can be configured according to any constraints in place on the EM state. The non-linear non-equality constraints yield for motor mode of operation $$d(x) = \begin{pmatrix} -U_m + \sqrt{v_d^2 + v_q^2} \\ -I_{max} + \sqrt{i_d^2 + i_q^2} \\ i_d \\ p^{sp} - f(x) \end{pmatrix}$$

and the non-linear equality constraints are given by $$d_{eq}(x) = \begin{pmatrix} T^{sp}(\omega, U_{dc}) - \frac{3n}{2}(\psi_m i_{mq} \mp (L_d - L_q) i_{md} i_{mq}) \\ A_{eq}^p x - b_{eq}^p \end{pmatrix}$$

where $$A_{eq}^p = \begin{pmatrix} -r_{cd} & \omega L_{mq} & r_{cd} & 0 & 0 & 0 \\ -\omega L_{md} & -r_{cq} & 0 & r_{cq} & 0 & 0 \\ r_{cd} & 0 & -r_{cd} + r & \omega L_\lambda & 1 & 0 \\ 0 & r_{cq} & \omega L_\lambda & -(r_{cq} + r) & 0 & 1 \end{pmatrix}$$

and $$b_{eq}^p = (0 \quad \omega \psi_m \quad 0 \quad 0)^T$$

Figure 7:
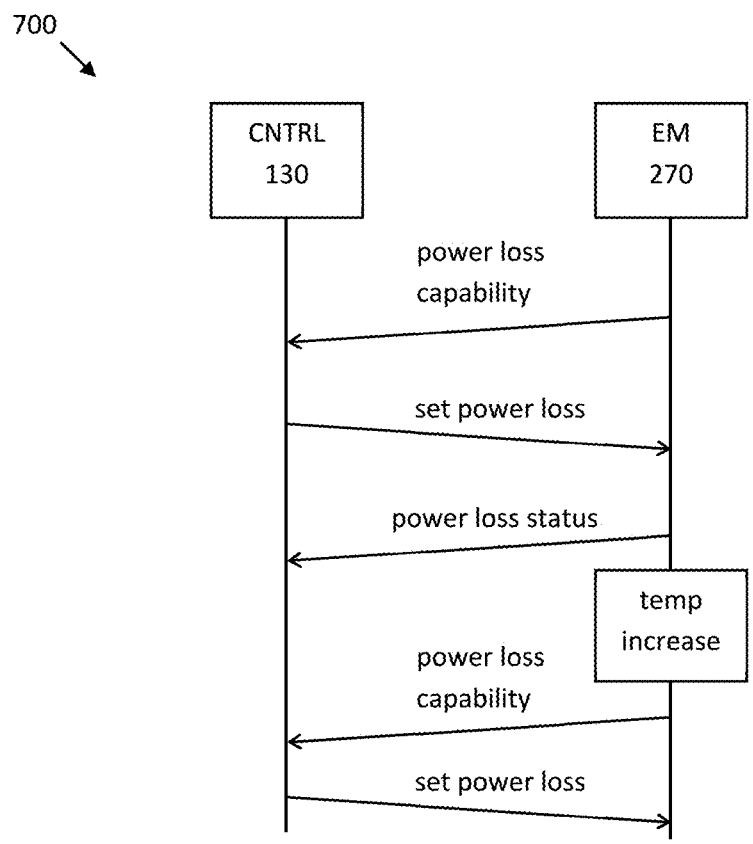
FIG. 7 is a signaling chart illustrating messaging in a control system.

FIG. 7 shows an example signaling diagram which illustrates the disclosed methods in terms of signaling over the interface 135 between vehicle control unit 130 and the EM subsystem control unit 270. In this example, the EM subsystem control unit first reports a power loss capability to the vehicle control unit. Based on the capabilities of the EM sub-system the vehicle control unit 130 then uses the interface 130 to the EM control unit 270 to set a desired power loss. This configuration is then acknowledged by the EM control unit by means of a power loss status message. In this example, the temperature of the electric machine then increases. To protect the components of the EM subsystem from overheating, a new lower power loss capability is reported to the vehicle control unit over the interface. This new capability report may result in an updated power loss setting by the vehicle control unit. Of course, the vehicle control unit 130 may respond to the new capability report in other ways. For instance, the vehicle control unit 130 may perform a different force allocation over the different vehicle motion support devices in order to reduce the torque requests on the EM subsystem reporting a reduced power loss capability. This way the vehicle control unit 130 can also balance energy dissipation over the whole vehicle combination. FIG. 4 illustrates an example operation of the signaling interface 135, shown in FIG. 2, for exchanging data between the vehicle control unit 130 and the EM control unit 270, i.e., a signaling interface arranged to carry a request from the vehicle control unit 130 to the EM control unit 270 indicating a desired efficiency level for operation by the EM.

The interface between the vehicle control unit 130 and the EM subsystem 110, comprising the EM control unit 270, deserves some special attention. To allow full flexibility in configuring different efficiency levels of the EM, while at the same time maintaining a robust and safe vehicle operation, the methods may comprise sending S32 a requested power loss from the vehicle control unit 130 to the EM control unit 270. This requested power loss may, as noted above, conveniently be defined relative to a nominal efficiency level or relative to some maximum obtainable efficiency level. FIG. 5 shows an example 500 where the desired power loss has been configured at 5 kW. It is noted that this power loss is maintained for a wide range of desired motor torques and motor speeds. In fact, it is noted that the EM subsystem is even able to sustain a power loss at zero generated torque. In other words, the EM subsystem may also assume a role similar to a braking resistance which can be used to dissipate energy even if no torque is generated by the electric machine.

The methods disclosed herein optionally also comprise sending S33 a power loss status report from the EM control unit 270 to the vehicle control unit 130. This power loss status report may comprise information such as, e.g., a current setting of power loss, allowing the vehicle control unit to verify that a requested power loss is actually in effect. As mentioned above, the EM control unit may also be configured to send S34 a power loss capability report to the vehicle control unit 130, thus informing the vehicle control unit 130 about what ranges of power losses that can be supported currently. This capability report may also comprise a prediction regarding a time period during which a current power loss can be sustained. This prediction can, e.g., be based on a rate of increase in temperature of the electric machine, and possibly also on past experiences during similar operating conditions, of which data has been stored in memory. In other words, the power loss capability report is optionally determined S35 based on a temperature level of the EM 110.

With reference to FIG. 2, most FC stacks 240 should, for durability reasons, not be stopped and re-started frequently. Hence it is desired that the FC stack 240 provides a minimum power output even if the power is not needed for propulsion. To allow for this constant generation of energy even when the ESS is fully charged, the method may comprise configuring S36 the efficiency level of the EM 110 in dependence of a minimum power output of an FC stack 240 in the vehicle 100.

The efficiency level of an electric machine is often a function of axle speed. Therefore, the method may also comprise configuring S37 a gear ratio associated with a transmission of the heavy-duty vehicle 100 in order to adjust the efficiency level of the EM.

Figure 9:
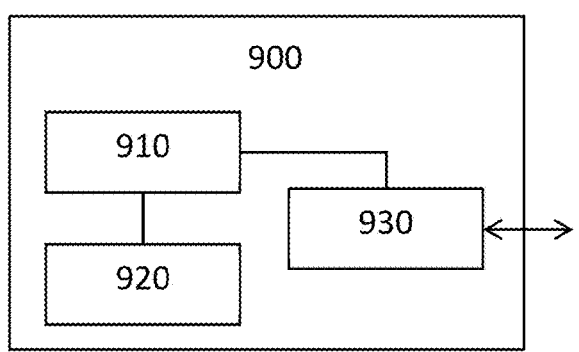
FIG. 9 schematically illustrates a control unit.

FIG. 9 schematically illustrates, in terms of a number of functional units, the components of a control unit such as the ECU 101. The control unit may implement one or more of the above discussed functions of the TSM, VMM and/or the MSD control function, according to embodiments of the discussions herein. The control unit is configured to execute at least some of the functions discussed above for control of a heavy-duty vehicle 100. Processing circuitry 910 is provided using any combination of one or more of a suitable central processing unit CPU, multiprocessor, microcontroller, digital signal processor DSP, etc., capable of executing software instructions stored in a computer program product, e.g., in the form of a storage medium 920. The processing circuitry 910 may further be provided as at least one application specific integrated circuit ASIC, or field programmable gate array FPGA.

Particularly, the processing circuitry 910 is configured to cause the control unit 101 to perform a set of operations, or steps, such as the methods discussed in connection to FIG. 8. In other words, FIG. 9 schematically illustrates a vehicle control unit 900 for controlling an electric machine 110 of a heavy-duty vehicle 100, where the heavy-duty vehicle comprises an energy storage system 120 connected to the EM 110. The control unit 900 comprises processing circuitry 910 configured to obtain S1 an energy absorption capability of the ESS 120, determine S2 an amount of regenerated energy by the EM 110 during braking, and configure S3 an efficiency level of the EM 110 in dependence of the energy absorption capability of the ESS 120 and the amount of regenerated energy by the EM 110 during braking.

For example, the storage medium 920 may store the set of operations, and the processing circuitry 910 may be configured to retrieve the set of operations from the storage medium 920 to cause the control unit 101 to perform the set of operations. The set of operations may be provided as a set of executable instructions. Thus, the processing circuitry 910 is thereby arranged to execute methods as herein disclosed.

The storage medium 920 may also comprise persistent storage, which, for example, can be any single one or combination of magnetic memory, optical memory, solid state memory or even remotely mounted memory.

The control unit 101 may further comprise an interface 930 for communications with at least one external device. As such the interface 930 may comprise one or more transmitters and receivers, comprising analogue and digital components and a suitable number of ports for wireline or wireless communication.

The processing circuitry 910 controls the general operation of the control unit 101, e.g., by sending data and control signals to the interface 930 and the storage medium 920, by receiving data and reports from the interface 930, and by retrieving data and instructions from the storage medium 920. Other components, as well as the related functionality, of the control node are omitted in order not to obscure the concepts presented herein.

FIG. 10 illustrates a computer readable medium 1010 carrying a computer program comprising program code means 1020 for performing the methods illustrated in FIG. 8, when said program product is run on a computer. The computer readable medium and the code means may together form a computer program product 1000.

The invention claimed is:
1. An electric machine for a heavy-duty vehicle, the electric machine comprising a stator and a rotor separated by an air gap,
wherein the stator comprises a stator reconfiguration device arranged to modify a magnetic property of the stator, wherein the stator reconfiguration device comprises first and second sections formed in different materials (M1, M2), wherein the different materials have different magnetic permeability properties, such that an orientation of the stator reconfiguration device relative to the stator influences the magnetic property of the stator,
wherein the stator is arranged to be mechanically reconfigurable by the stator reconfiguration device to allow control of magnetic flux in the air gap,
wherein the stator reconfiguration device comprises one or more conduits for passing a cooling medium through the stator reconfiguration device.

2. The electric machine according to claim 1, where the stator is axially fixed with respect to the rotor.

3. The electric machine according to claim 1, where the first section is formed in a material with high magnetic permeability such as soft magnetic composite or laminated magnetic steel, and where the second section which is formed in a low magnetic permeability material such as copper or aluminum.

4. The electric machine according to claim 1, where the stator reconfiguration device is a rod extending in a longitudinal direction axially (A) along the stator, where the rod is axially divided into first and second sections, where the two sections are associated with different magnetic permeabilities, and where the stator reconfiguration device is rotatably mounted about the longitudinal axis to allow control of the magnetic flux in the air gap by rotation of the stator reconfiguration device.

5. The electric machine according to claim 1, where the stator reconfiguration device is a rod extending in a longitudinal direction axially (A) along the stator, where the rod is divided into first and second sections by a plane extending transversal to the longitudinal direction of the rod, where the two sections are associated with different magnetic permeabilities, and where the stator reconfiguration device is slidably mounted in the axial direction (A) relative to the stator to allow control of magnetic flux in the air gap by longitudinal displacement of the rod.

6. The electric machine according to claim 1, where the different materials have respective high and low relative magnetic permeability properties, where the one or more conduits are arranged in the section associated with the low magnetic permeability property.

7. The electric machine according to claim 1, comprising a stator geometry control unit arranged to control the orientation of the stator reconfiguration device based on a received control signal.

8. The electric machine according to claim 1, comprising a temperature sensor arranged to measure a temperature of the stator reconfiguration device.

9. A vehicle control unit for controlling an electric machine (EM) of a heavy-duty vehicle, the EM comprising a stator and a rotor separated by an air gap, where the stator comprises a stator reconfiguration device arranged to modify a magnetic property of the stator, whereby the stator is mechanically reconfigurable by the stator reconfiguration device to allow control of magnetic flux in the air gap, wherein the stator reconfiguration device comprises first and second sections formed in different materials (M1, M2), wherein the different materials have different magnetic permeability properties, such that an orientation of the stator reconfiguration device relative to the stator influences the magnetic property of the stator, wherein the stator reconfiguration device comprises one or more conduits for passing a cooling medium through the stator reconfiguration device,
wherein the heavy-duty vehicle comprises an energy storage system, (ESS) connected to the EM, the control unit comprising processing circuitry configured to:
obtain an energy absorption capability of the ESS,
determine an amount of regenerated energy by the EM during braking, and configure an efficiency level of the EM in dependence of the energy absorption capability of the ESS and the amount of regenerated energy by the EM during braking, at least in part by reconfiguring the stator reconfiguration device.

10. The vehicle control unit according to claim 9, where the processing circuitry is configured to predict an amount of regenerated energy from the EM based on a planned route of the vehicle, and to control the stator reconfiguration device in dependence of the predicted amount of regenerated energy.

11. The vehicle control unit according to claim 9, where the processing circuitry is configured to send a control signal comprising a requested power loss level to an EM control unit arranged to control the position of the stator reconfiguration device in dependence of the requested power loss level.

12. The vehicle control unit according to claim 9, where the processing circuitry is configured to receive a power loss capability report from the EM control unit, the power loss capability report comprising information about what ranges of power losses that can be supported currently.

13. A vehicle comprising an electric machine (EM) according to claim 1.

14. The vehicle according to claim 13, wherein the vehicle comprises an energy storage system (ESS) connected to a vehicle control unit that includes processing circuitry configured to:
  obtain an energy absorption capability of the ESS,
  determine an amount of regenerated energy by the EM during braking, and
  configure an efficiency level of the EM in dependence of the energy absorption capability of the ESS and the amount of regenerated energy by the EM during braking, at least in part by reconfiguring the stator reconfiguration device.

* * * * *